(12) United States Patent
Nakashima

(10) Patent No.: US 6,484,081 B1
(45) Date of Patent: Nov. 19, 2002

(54) POWER STEERING SYSTEM

(75) Inventor: Seiji Nakashima, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 1 day.

(21) Appl. No.: 09/584,632

(22) Filed: May 31, 2000

(30) Foreign Application Priority Data

Jul. 7, 1999 (JP) .......... 11-193158

(51) Int. Cl.[7] .......... G06F 7/00
(52) U.S. Cl. .......... 701/41; 180/422
(58) Field of Search .......... 701/41, 42; 180/422, 180/6.28, 6.3, 417, 442, 443, 446; 318/434, 465

(56) References Cited

U.S. PATENT DOCUMENTS 5,323,866 A 6/1994 Simard et al. .......... 180/6.28
5,469,928 A 11/1995 Adler et al. .......... 180/6.28
6,069,460 A * 5/2000 Grabowski et al. .......... 318/434
6,173,223 B1 * 1/2001 Liubakka et al. .......... 701/42

FOREIGN PATENT DOCUMENTS

| EP | 0 926 042 A1 | 6/1999 | .......... B62D/5/06 |
| JP | 9-301209 | 11/1997 | |
| TW | 253876 | 8/1995 | .......... B62D/5/02 |

* cited by examiner

Primary Examiner—William A. Cuchlinski, Jr.
Assistant Examiner—Edward Pipala
(74) Attorney, Agent, or Firm—Morgan & Finnegan, LLP

(57) ABSTRACT

A steering wheel angle sensor detects the rotational speed of a steering wheel. A wheel angle sensor detects the off-center angle of a wheel. A controller drives a motor based on the outputs of the steering wheel angle sensor and the wheel angle sensor. An oil pump generates an oil pressure according to the revolution speed of the motor. A steering valve determines the supply direction of hydraulic fluid to be supplied to a PS cylinder. The PS cylinder changes the angle of the wheel according to the given oil pressure.

4 Claims, 5 Drawing Sheets

POWER STEERING SYSTEM

BACKGROUND OF THE INVENTION

1. Field of the Invention

The present invention relates to a power steering system.

2. Description of the Related Art

A power steering system has been widely used in an automobile or an industrial vehicle as a device for assisting the steering operation of a steering wheel. Especially, for an industrial vehicle such as a forklift, etc., the steering operation of a steering wheel is heavy if the vehicle does not comprise a power steering system. Therefore, such an industrial vehicle is equipped with a power steering system in most cases.

FIG. 1 schematically shows an existing power steering system. In this system, when an operator or a driver steers a steering wheel 101, a sensor (such as a rotational angular sensor or a torque sensor) 103, which is attached to a steering shaft 102, detects this steering operation. A controller 104 controls a motor 106 for driving an oil pump 105 based on the output of the sensor 103. In this way, an oil pressure (output) corresponding to the steering operation of the steering wheel 101 is generated. Then, the generated oil pressure is transmitted from a PS valve 107 to a PS cylinder 108. This oil pressure generates a thrust for changing the angle of wheels 110, so that the angle of the wheels 110 is controlled.

In the system having the above described configuration, when the steering wheel 101 is turned fast, a large output is required to quickly change the angle of the wheels 110. Therefore, the controller 104 rotates the motor 106 at a high speed. In the meantime, when the steering wheel 101 is turned slowly, a small output is sufficient. Accordingly, the controller 104 rotates the motor 106 at a low speed.

The controller 104 controls a revolution speed of the motor 106 with a PWM (Pulse-Width Modulation) method. That is to say, when rotating the motor 106 at a low speed, the controller 104 provides the motor 106 with a pulse signal having a small duty (duty cycle or duty ratio) as a control signal. In the meantime, when rotating the motor 106 at a high speed, the controller 104 provides the motor 106 with a pulse signal having a large duty. Note that "duty" is a time ratio of an operation period in a cycle to a entire period of the cycle.

FIG. 2A explains a motor controlling method for use in the existing system shown in FIG. 1. Here, the revolution speed of the motor 106 is determined by the duty of the control signal generated by the controller 104.

With this system, the revolution speed of the motor 106 is controlled to be low so as to consume less power while the steering wheel 101 is not being turned. In the example shown in FIG. 2A, the controller 104 controls the motor 106 at a duty of 30 percent, during the steering wheel 101 is not being turned. When the steering wheel 101 is being turned, the duty of the control signal provided to the motor 106 changes depends on the rotational speed of the steering wheel 101. Namely, the duty of the control signal increases as the rotational speed of the steering wheel 101 becomes faster.

As described above, in the power steering system having the above described configuration, the motor 106 is controlled by using the control signal generated by the controller 104, so that the angle of the wheels 110 is controlled according to the steering operation of the steering wheel 101.

Furthermore, in the system having the above described configuration, the angle of the wheels 110 is controlled by using an oil pressure. However, the thrust required to change the angle of the wheels 110 may differ depending on the off-center angle of the wheels 110 at that timing, as shown in FIG. 2B. Namely, when the wheels 110 are in a neutral state, and when the off-center angle of the wheels 110 against the car body is small, the thrust required to change the angle of the wheels 110 is relatively small. In the meantime, when the off-center angle of the wheels 110 against the car body becomes large, the thrust required to change the angle of the wheels 110 increases. This results from a configurations of the PS cylinder 108 and a rod 109 and so on.

As described above, when the steering wheel 101 is not being turned, the revolution speed of the motor 106 is set to be low so as to consume less power. Thus, when the steering wheel 101 starts to be turned, the motor 106 is being driven at a duty of 30 percent at this timing, as shown in FIG. 2A. Therefore, at this timing, the revolution speed of the motor 106 is low, and the output generated by the oil pump 105 is small.

Accordingly, if the steering wheel 101 starts to be turned when the wheels 110 are in the neutral state or in a state close thereto, the steering operation is smooth. However, if the steering wheel 101 starts to be turned when the off-center angle of the wheels 110 against the car body is large, the steering operation feels heavy.

SUMMARY OF THE INVENTION

An object of the present invention is to provide a power steering system which consumes less power, and implements a smooth steering operation in all cases.

With the power steering system according to the present invention, the thrust (such as an oil pump output) for changing the angle of a wheel is determined based on the rotational speed of a steering wheel and the off-center angle of the wheel.

With this configuration, since the output for generating a thrust is determined based on the rotational speed of a steering wheel and the off-center angle of a wheel, even if the thrust required to change the angle of the wheel differs depending on the off-center angle of the wheel at a timing when the steering wheel is steered, a necessary and sufficient thrust can always be obtained, thereby a smooth steering operation can be implemented in all cases.

A power steering system according to another preferred embodiment of the present invention assumes a hydraulic system. This power steering system comprises a rotational speed detector detecting the rotational speed of a steering wheel; an angle detector detecting the off-center angle of a wheel; an oil pump generating the output for changing the angle of the wheel; and a controller driving the oil pump based on the rotational speed of the steering wheel, which is detected by the rotational speed detector, and the off-center angle of the wheel, which is detected by the angle detector.

Also with the system having this configuration, a smooth steering operation can be implemented in all cases by a function similar to that of the system according to the above described preferred embodiment. Specifically, for example, the controller controls the output of the oil pump so that the thrust generated in the case where the off-center angle of the wheel is large becomes larger than that generated in the case where the off-center angle of the wheel is small, when the steering wheel stops.

DESCRIPTION OF THE PREFERRED EMBODIMENTS

Figure 1:
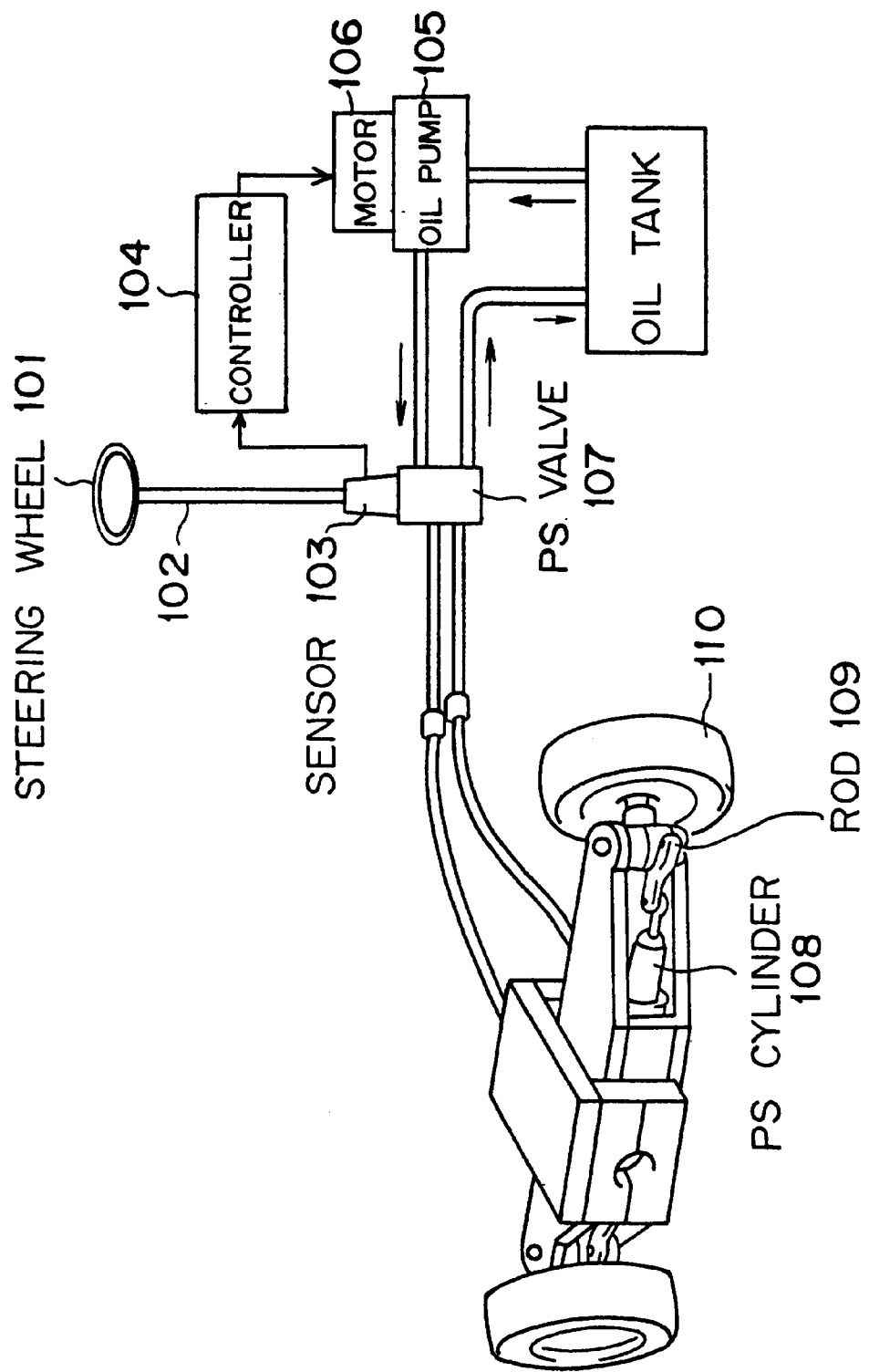
FIG. 1 schematically shows an existing power steering system.

Hereinafter, a preferred embodiment according to the present invention is explained by referring to the drawings.

Figure 3:
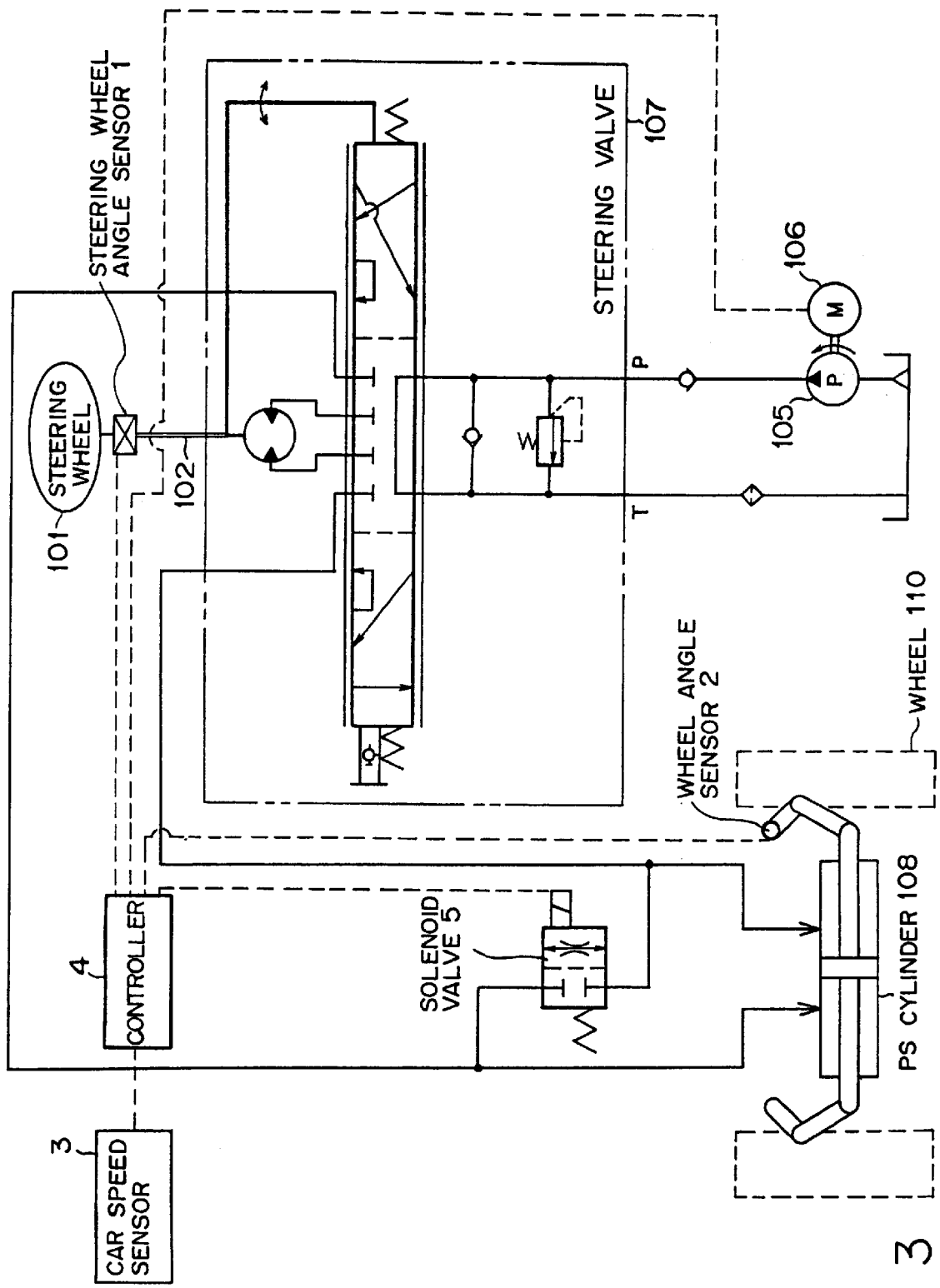
FIG. 3 shows the configuration of a power steering system according to a preferred embodiment of the present invention.

FIG. 3 shows the configuration of a power steering system according to a preferred embodiment of the present invention. Among the reference numerals used in FIG. 3, the numerals used in FIG. 1 indicate the same constituent elements.

A steering wheel angle sensor 1 is attached to a steering shaft 102, and detects the rotational angle of a steering wheel 101. The steering wheel angle sensor 1 outputs one pulse each time the steering wheel 101 rotates by a predetermined angle. Assume that the steering wheel angle sensor 1 is designed to output one pulse each time the steering wheel 101 rotates by two degrees. In this case, the steering wheel angle sensor 1 outputs 90 pulses when the steering wheel 101 is turned by 180 degrees.

A wheel angle sensor 2 detects the angle (off-center angle) of wheels 110, and outputs the result of the detection, for example, as a pulse signal. A car speed sensor 3 detects the running speed of the car equipped with this power steering system.

As the steering wheel angle sensor 1, the wheel angle sensor 2, and the car speed sensor 3, existing sensors can be used unchanged.

A controller 4, which will be explained later in a specific manner, controls the output (oil pressure) generated by an oil pump 105 by controlling the revolution speed of a motor 106 based on the outputs of the steering wheel angle sensor 1, the wheel angle sensor 2, and the car speed sensor 3. Note that the controller 4 can detect the rotational speed (or the angular speed) of the steering wheel 101 based on the number of pulses which are received from the steering wheel angle sensor 1 per unit time.

A solenoid valve 5 adjusts the oil pressure supplied to a PS cylinder 108 so that the position of the steering wheel 101 (by what degrees the steering wheel 101 rotates from a neutral state), which is represented by the steering wheel angle sensor 1, is properly corresponded to, the off-center angle of the wheels 110, which is represented by the output of the wheel angle sensor 2. The operations of the solenoid valve 5 comply with, for example, an instruction from the controller 4.

Figure 4:
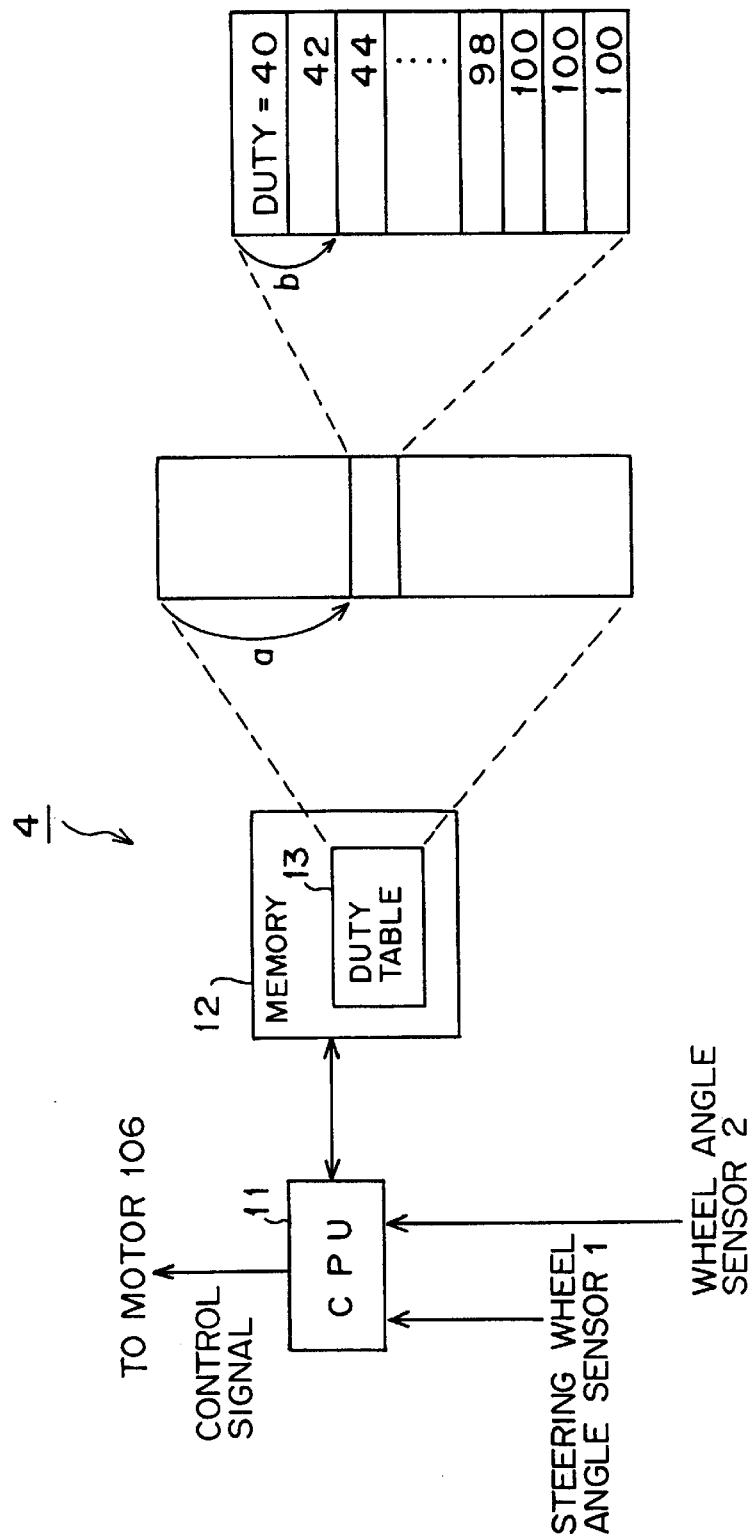
FIG. 4 explains the configuration of a controller.

FIG. 4 explains the configuration of the controller 4. As described above, the controller 4 controls the revolution speed of the motor 106 based on the outputs of the steering wheel angle sensor 1, the wheel angle sensor 2, and the car speed sensor 3. Here, for ease of explanation, it is assumed that the revolution speed of the motor 106 is controlled based only on the outputs of the steering wheel angle sensor 1 and the wheel angle sensor 2.

A CPU 11 detects both the rotational speed of the steering wheel 101 based on the output of the steering wheel angle sensor 1, and the off-center angle of the wheels 110 based on the output of the wheel angle sensor 2. The CPU 11 then references a duty table 13 stored in a memory 12 by using the detected speed and angle as search keys. In the memory 12, a program executed by the CPU 11, and the duty table 13 are stored. To the duty table 13, a duty value which respectively corresponds to a combination of two search keys (the rotational speed of the steering wheel 101, and the off-center angle of the wheels 110) are registered.

Figure 5A:
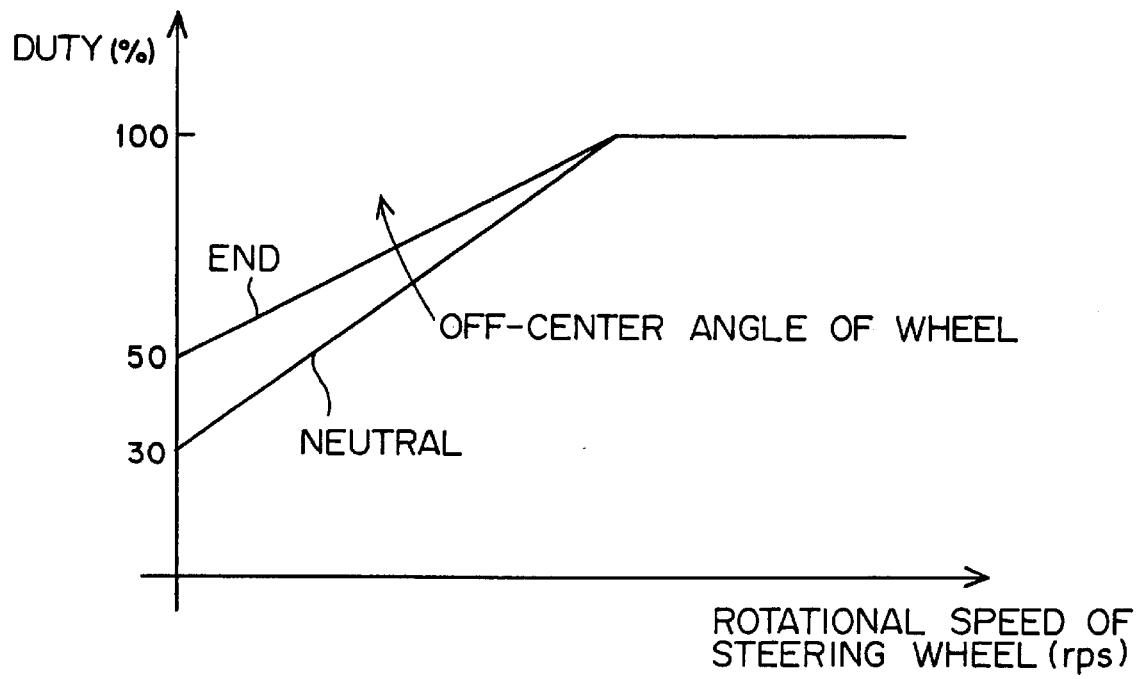
FIG. 5A schematically shows the duty information registered in a duty table.

FIG. 5A schematically shows the duty information registered in the duty table 13.

Figure 5B:
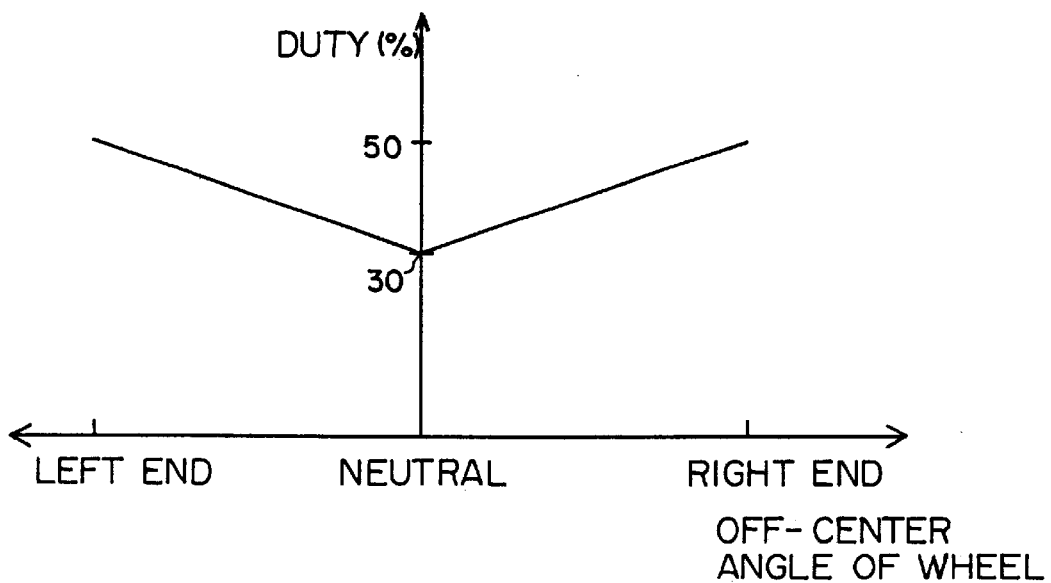
FIG. 5B shows the relationship between the off-center angle of wheels and a duty.

The duty of the control signal for driving the motor 106 changes not only with the rotational speed of the steering wheel 101, but also with the off-center angle of the wheels 110. That is to say, the duty becomes larger with an increase in the rotational speed of the steering wheel 101, and also becomes larger with an increase in the off-center angle of the wheels 110 in a range where the rotational speed of the steering wheel 101 is slow. In this preferred embodiment, the duty successively changes from 30 to 50 percents while a state of the wheels 110 changes from a neutral state to the end state, as shown in FIG. 5B, when the rotational speed of the steering wheel 101 is "0". The "end state" is a state where the off-center angle of the wheels 110 becomes a maximum.

Next, the operations of the power steering system having the above described configuration are explained. Also here, for ease of explanation, it is assumed that the revolution speed of the motor 106 is controlled based only on the outputs of the steering wheel angle sensor 1 and, the wheel angle sensor 2.

The controller 4 continuously monitors the rotational speed of the steering wheel 101 and the off-center angle of the wheels 110 based on the outputs of the steering wheel angle sensor 1 and the wheel angle sensor 2. The controller 4 obtains the corresponding duty value by referencing the duty table 13 with the use of the detected values as search keys, and drives the motor 106 according to that duty. As a result, the oil pump 105 generates the output that corresponds to the rotational speed of the steering wheel 101 and the off-center angle of the wheels 110.

The steering valve 107 operates according to the steering operation of the steering wheel 101, and switches the supply direction of hydraulic fluid to the PS cylinder 108 corresponding to the rotational direction of the steering wheel 101. Accordingly, when the steering wheel 101 is steered, the hydraulic fluid having the output (thrust) that corresponds to the rotational speed of the steering wheel 101 and the off-center angle of the wheels 110 is supplied to the PS cylinder 108 in such a way that an angle of the wheels 110 is changed corresponding to the rotational direction of the steering wheel 101. In this way, the direction of the wheels 110 is controlled.

Figure 2A:
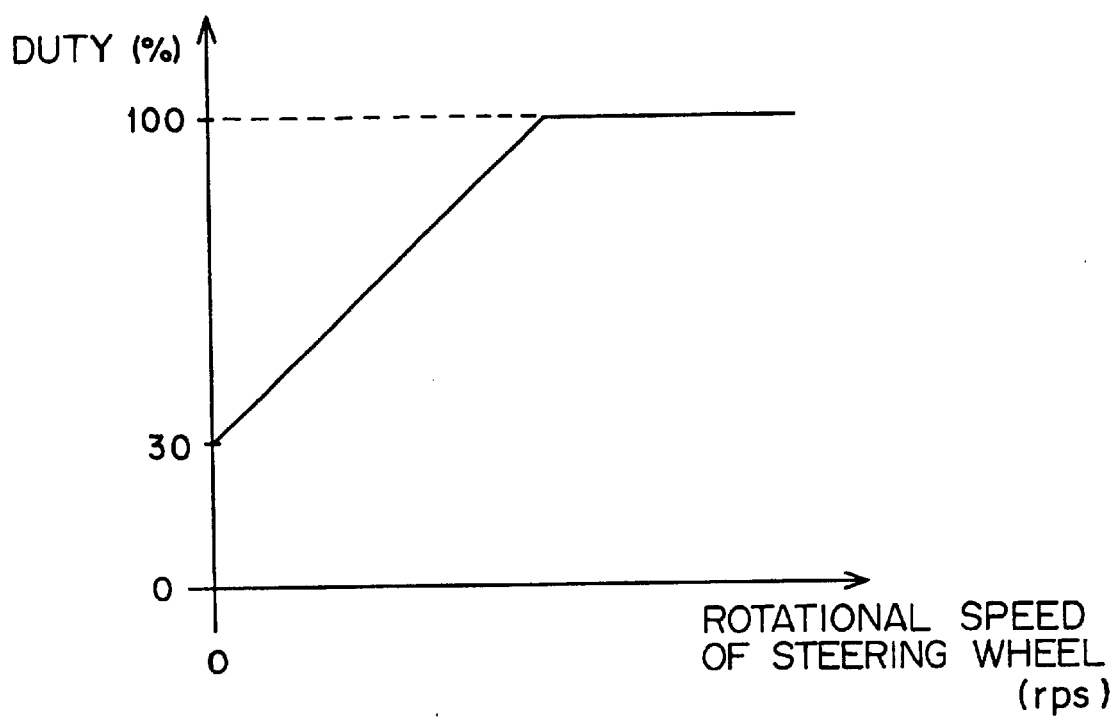
FIG. 2A explains an existing motor controlling method.
Figure 2B:
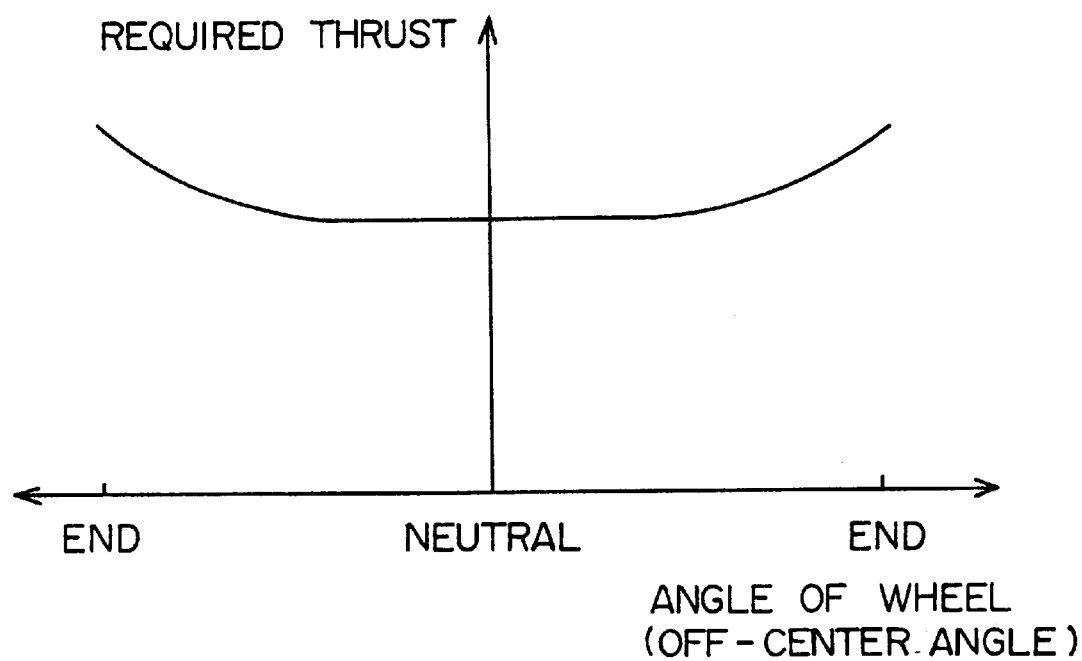
FIG. 2B shows the relationship between the off-center angle of wheels and the thrust required to change the angle of the wheels.

In the power steering system having the above described configuration, when the wheels 110 are in the neutral state or a state close thereto, and when the steering wheel 101 stops, the controller 4 drives the motor 106 at a small duty. In the example shown in FIG. 5A, the controller 4 is driving the motor 106 at a duty of 30 percent. Accordingly, power consumed by the power steering system is suppressed to be low during this time period. In addition, when the wheels 110 are in the neutral state or a state close thereto, a large thrust is not required to change the angle of the wheels 110 as explained by referring to FIG. 2B. Namely, when the wheels 110 are in the neutral state or a state close thereto, the direction of the wheels 110 can be easily controlled even with a thrust obtained at a small duty. Therefore, while the wheels 110 are in the neutral state or a state close thereto, the steering wheel 101 can be smoothly turned when an operator or a driver starts the steering operation, even if the revolution speed of the motor 106 is suppressed to be low. As a result, low consumption power and a smooth steering operation of the system can be realized at the same time.

In the meantime, if the off-center angle of the wheels 110 is close to the end state, the controller 4 drives the motor 106 at a relatively large duty even when the steering wheel 101 stops. In the above described example, the controller 4 drives the motor 106 at a duty of 50 percent. Here, if the off-center angle of the wheels 110 is close to the end state, a somewhat large thrust is required to change the angle of the wheels 110 as described above. However, in the power steering system according to this preferred embodiment, while the off-center angle of the wheels 110 is close to the end state, the motor 106 has been driven at a relatively large duty even if the steering wheel is stopped. That is to say, the oil pump 105 has been generating a relatively large output (thrust) corresponding to the duty, when an operator or a driver starts to steer the steering wheel 101. The angle of the wheels 110 is easily controlled by the steering operation that an operator or a driver performs. Namely, the operator or the driver can smoothly turn the steering wheel 101.

In the above described preferred embodiment, the rotational speed of the steering wheel 101 is detected based on the output of the steering wheel angle sensor 1 that is attached to the steering shaft 102, and at the same time, the off-center angle of the wheels 110 is detected based on the output of the wheel angle sensor 2 that is attached close to the wheel 110. However, the rotational speed of the steering wheel 101 and the off-center angle of the wheels 110 may be detected based only on the output of the steering wheel angle sensor 1. In this case, however, conditions such that the position of the steering wheel 101 (by what degree the steering wheel 101 rotates from the neutral state) is properly corresponded to the off-center angle of the wheels 110, and the rotational direction of the steering wheel 101 is detectable based on the output of the steering wheel angle sensor 1 are imposed.

Additionally, in the above described preferred embodiment, the controller 4 controls the motor 106 based on the outputs of the steering wheel angle sensor 1 and the wheel angle sensor 2. However, another or other parameters may be taken into account. For example, the motor 106 may be controlled based on the outputs of the steering wheel angle sensor 1, the wheel angle sensor 2, and the car speed sensor 3. In this case, for example, a method decreasing the duty of the control signal for driving the motor 106 in the case where a vehicle is running at a high speed may be considered in comparison with the case where the vehicle is running at a low speed.

Furthermore, the power steering system according to the present invention can be applied not only to an industrial vehicle, but also to a general automobile.

Still further, the above described preferred embodiment adopts the hydraulic power steering system, and refers to the system generating an oil pressure that corresponds to the rotational speed of a steering wheel and the off-center angle of a wheel. However, the present invention is not limited to this configuration. Namely, the present invention covers all of systems that determine the thrust for changing the angle of a wheel based on the rotational speed of a steering wheel and the off-center angle of a wheel.

As described above, according to the present invention, a pump output for changing the angle of a wheel is decided by considering not only the rotational speed of a steering wheel but also the off-center angle of a wheel, thereby implementing a smooth steering operation in all cases. Additionally, if the thrust required to change the angle of a wheel is small, the above described pump output is controlled to be small. Consequently, less power is consumed.

What is claimed is:

1. A power steering system which determines a thrust for changing an angle of a tire based on a rotational speed of a steering wheel and a off-center angle of the tire, so that the thrust in the case where the off-center angle of the tire is large is larger than a thrust in a case where the off-center angle of the tire is small, when the steering wheel stops or the rotational speed of the steering wheel is slow.

2. A hydraulic power steering system, comprising:
   a rotational speed detector detecting a rotational speed of a steering wheel;
   an angle detector detecting an off-center angle of a tire;
   an oil pump generating an output for changing an angle of the tire; and
   a controller driving said oil pump based on the rotational speed of the steering wheel, which is detected by said rotational speed detector, and the off-center angle of the tire, which is detected by said angle detector, wherein said controller controls the output of said oil pump so that a thrust in the case where the off-center angle of the tire is large is larger than a thrust in a case where the off-center angle of the tire is small, when the steering wheel stops or the rotational speed of the steering wheel is slow.

3. The power steering system according to claim 2, wherein:
   said oil pump includes a motor which is controlled by said controller with a PWM method;
   said controller controls a revolution speed of the motor by using a pulse signal having a duty corresponding to a combination of the rotational speed and the off-center angle; and
   said oil pump generates a thrust corresponding to the revolution speed of the motor.

4. The power steering system according to claim 3, wherein
   said controller comprises a table storing a duty value corresponding to a combination of the rotational speed and the off-center angle as a key.

* * * * *